(12) United States Patent
Osann, Jr.

(10) Patent No.: US 9,386,141 B2
(45) Date of Patent: Jul. 5, 2016

(54) AUTOMATIC NOTIFICATION OF POTENTIAL EMERGENCY CONDITION DURING TRAVEL

(71) Applicant: Robert Osann, Jr., Port Angeles, WA (US)

(72) Inventor: Robert Osann, Jr., Port Angeles, WA (US)

( * ) Notice: Subject to any disclaimer, the term of this patent is extended or adjusted under 35 U.S.C. 154(b) by 0 days.

(21) Appl. No.: 14/791,423

(22) Filed: Jul. 4, 2015

(65) Prior Publication Data

US 2016/0006855 A1  Jan. 7, 2016

Related U.S. Application Data

(60) Provisional application No. 62/021,168, filed on Jul. 6, 2014.

(51) Int. Cl.
| | | |
|---|---|---|
| *H04W 4/22* | (2009.01) | |
| *H04M 1/725* | (2006.01) | |
| *H04W 76/00* | (2009.01) | |
| *H04W 4/02* | (2009.01) | |

(52) U.S. Cl.
CPC .......... *H04M 1/72538* (2013.01); *H04W 4/025* (2013.01); *H04W 4/028* (2013.01); *H04W 4/22* (2013.01); *H04W 76/007* (2013.01)

(58) Field of Classification Search
CPC ..... H04W 4/22; H04W 76/007; H04W 64/00; H04W 4/02; H04W 4/025; H04W 4/028; G08B 25/016; H04M 1/72538
See application file for complete search history.

(56) References Cited

U.S. PATENT DOCUMENTS

| | | | |
|---|---|---|---|
| 5,504,482 A | * | 4/1996 | Schreder ............... G01C 21/16 340/988 |
| 6,700,506 B1 | | 3/2004 | Winkler et al. |
| 7,136,747 B2 | | 11/2006 | Raney |
| 7,394,403 B2 | | 7/2008 | Winkler et al. |
| 7,940,172 B2 | | 5/2011 | Bell et al. |
| 8,204,682 B2 | | 6/2012 | Hatami |
| 8,681,023 B2 | | 3/2014 | Giuli et al. |
| 9,020,530 B2 | | 4/2015 | Kim |
| 9,071,931 B2 | | 6/2015 | Diem |
| 9,119,033 B2 | | 8/2015 | Diem |
| 9,143,934 B2 | | 9/2015 | Parker, II |
| 9,179,316 B2 | | 11/2015 | Raleigh |
| 9,232,356 B2 | | 1/2016 | Holland |
| 9,253,616 B1 | | 2/2016 | Haney |
| 2002/0016189 A1 | * | 2/2002 | Sheynblat ............... G01S 19/05 455/574 |
| 2006/0276201 A1 | * | 12/2006 | Dupray ................. G01S 5/0257 455/456.1 |
| 2009/0115572 A1 | * | 5/2009 | Valbh ..................... G06Q 10/00 340/7.58 |
| 2011/0021234 A1 | * | 1/2011 | Tibbitts ................. H04W 48/04 455/517 |

* cited by examiner

*Primary Examiner* — Ted Wang

(57) ABSTRACT

Systems and methods are disclosed for tracking the progress of a trip where a person or persons wish to have a third party automatically informed of a delayed return. For long duration trips and/or trips to distant destinations, people typically make provision for having their pets and/or children watched over. However for short trips, they typically do not, especially with respect to their pets. The disclosed methods provide monitoring of a trip's progress such that if a traveler doesn't return home by a certain time, a third party is notified, thus avoiding a prolonged period of time wherein the pets and/or children are unattended, especially in the event of a catastrophic accident. The third party may be notified if an arrival time is predicted to be delayed, and when an actual arrival occurs. Provision is also included for adjusting the trip duration to delay or advance a designated arrival time.

17 Claims, 3 Drawing Sheets

- Receive a request from a user to register/setup a trip, including one or more designated travelers and associated cell phone numbers, a designated arrival date and time for the trip, contact information for emergency contact persons, and a designated GPS-locatable arrival location.

S202

- Track phone locations for the one or more designated travelers.

S204

- If the designated arrival time passes (either original arrival time or extended arrival time) before any designated phone belonging to the one or more travelers arrives at the arrival location, then determine that an emergency condition may exist and send a message (text, email, or automated call) to one or more responsible 3$^{rd}$ parties (emergency contact persons) to request that they perform at least one or more of:
  - Attempting to contact the one or more designated travelers; and
  - If the one or more travelers cannot be contacted, then taking an emergency action that comprises one or more of:
    - Accessing the home location to care for pets and/or people.
    - Contacting law enforcement to report that the one or more travelers are missing.

AUTOMATIC NOTIFICATION OF POTENTIAL EMERGENCY CONDITION DURING TRAVEL

PRIORITY CLAIM

This application claims priority to U.S. Provisional Application No. 62/021,168 filed on Jul. 6, 2014 by inventor Robert Osann, Jr., and entitled "Trip Automatic Emergency Notification".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to systems and methods for tracking mobile communication devices, and communicating among users, Internet services, and $3^{rd}$ parties.

BACKGROUND

There are times when family members are travelling, and where a catastrophic event that incapacitates or kills the travelling family members would place pets and/or other people at their home in jeopardy should the travelers not return for days, weeks, or at all. For long duration trips and/or trips to distant destinations, people typically make provision for having their pets and/or children watched over. However for short trips—especially day trips—they typically do not, especially with respect to their pets. A day trip may include driving for many hours, and the real possibility exists for a catastrophic accident to occur without any friends or family being aware.

A solution is needed to provide automatic notification of responsible persons should such unfortunate eventualities occur, and/or when conditions exist that indicate the potential for such emergency conditions. At the same time, an automatic notification system should include provisions to avoid unnecessarily disturbing those responsible persons.

Note that a "home" location and an "arrival" location are used interchangeably. Note that a "return" time and an "arrival" time are used interchangeably since the most frequently designated arrival time will be when travelers return home. Also note that a user registering with the system to set up and track a trip according to the invention may or may not be a traveler. $3^{rd}$ parties may or may not be emergency contact persons, depending on how a particular trip is set up.

BRIEF DESCRIPTION OF THE DRAWINGS

FIG. 2 shows a flow chart for a first exemplary embodiment of the invention wherein $3^{rd}$ parties are notified if travelers don't return home (the designated arrival location) by a specified date/time.

SUMMARY

Figure 1:
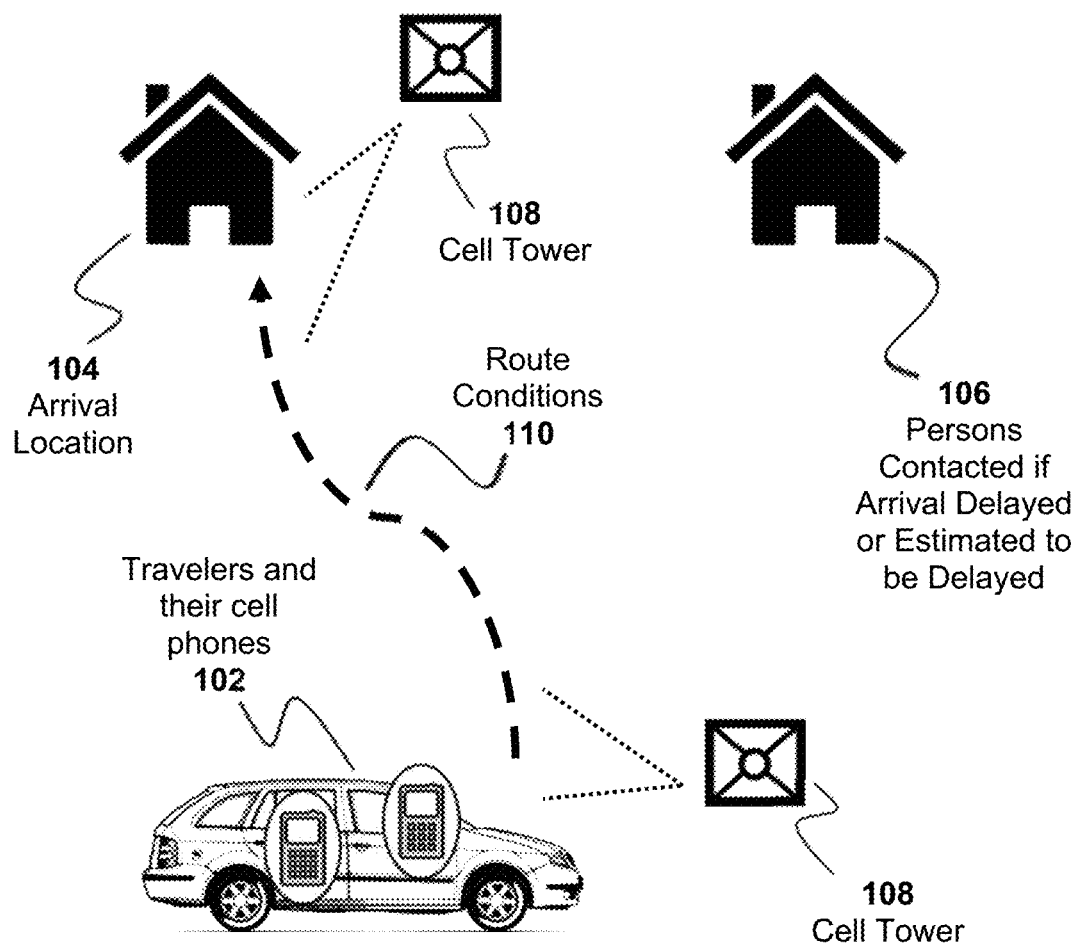
FIG. 1 shows a diagram including some key components involved in the operation of methods according to the invention.

Systems and methods are disclosed for tracking the progress of a trip where a person or persons wish to have a third party automatically informed of a delayed return, or even a predicted delayed return. The disclosed methods provide monitoring of a trip's progress such that if a traveler doesn't return home by a certain time, a third party is notified, thus avoiding a prolonged period of time wherein pets and/or children are unattended, especially in the event of a catastrophic accident. The third party may also be notified if a return time is predicted to be delayed. Provision is also included for extending/adjusting the trip time. Optionally, upon the travelers reaching the arrival location, third parties may be notified that the travelers have arrived. In some cases—especially for day trips—the emergency contact persons may not be aware (and may never be aware) that the trip is taking place. As such, it is important that the system not disturb those persons unless it is deemed necessary according to the strategy that is set up by a user for the trip.

A first object of the invention is to provide a computerized method performed using one or more processors and a cellular communications network for notification of a potential emergency condition, comprising:
  receiving from a first user:
    cellular phone numbers for one or more designated travelers; a designated date and time for an expected arrival (hereinafter: the designated arrival time) at an arrival location;
    one or more emergency contact persons to be notified of a potential emergency condition; and
    contact information for the one or more emergency contact persons;
  tracking using at least GPS data, locations of the one or more designated travelers to determine a proximity of the one or more designated travelers with respect to the arrival location; and
  determining at the designated arrival time, that a potential emergency condition exists because the one or more travelers have not reached the arrival location.

Another object of the invention is to contact the one or more emergency contact persons to inform them of the potential emergency condition.

Another object of the invention is that upon determination that a potential emergency condition exists, and before contacting the one or more emergency contact persons, there is an attempt to contact the one or more travelers to determine if the potential emergency condition is, or is not, an actual emergency condition. If the travelers are in or near an area with little or no cellular coverage, the system can allow some additional time for a response before contacting $3^{rd}$ parties.

Another object of the invention is to additionally receive from the first user, a prioritized sequence for contacting the one or more emergency contact persons, when the one or more emergency contact persons comprise a plurality of persons.

Another object of the invention is to contact the one or more emergency contact persons in the prioritized sequence.

Another object of the invention is to provide a capability to adjust the designated arrival time during the trip to create a new designated arrival time, where the adjusting is performed by the user or any of the designated travelers.

Another object of the invention is to send a warning message to one or more of the travelers at a specified point in time in advance of the designated arrival time under one or more of the following conditions:

a) regardless of the one or more traveler's current location;
b) if the one or more traveler's current location is not within a specified distance from the arrival location; or
c) if a rate of travel of the one or more travelers isn't consistent with an arrival at the arrival location by the designated arrival time.

Another object of the invention is that if the one or more travelers don't respond to the warning message within a specified amount of time, then the one or more emergency contact persons are informed of a current location or last known location of the one or more travelers. This enables the emergency contact persons to better inform authorities if appropriate.

Another object of the invention is that if the last known location of the one or more travelers was in or near areas known to have little or no cellular coverage, additional time is allowed before informing the one or more emergency contact persons that the one or more travelers didn't respond to the warning message.

Another object of the invention is to provide a computerized method performed using one or more processors and a cellular communications network for notification of a potential emergency condition, comprising:

receiving from a first user:
    cellular phone numbers for one or more designated travelers;
    a designated date and time for an expected arrival (hereinafter: the designated arrival time) at an arrival location;
    one or more emergency contact persons to be notified of a potential emergency condition; and
    contact information for the one or more emergency contact persons;
tracking using at least GPS data, locations of the one or more designated travelers to determine a proximity of the one or more designated travelers with respect to the arrival location;
determining a predicted arrival time for the one or more designated travelers to reach the arrival location, based at least in part on a current location for the one or more designated travelers and applicable route conditions; and
if the predicted arrival time is later than the designated arrival time, determining that a potential emergency condition exists.

DETAILED DESCRIPTION

FIG. 1 shows a diagram including some key components involved in the operation of computerized methods according to the invention. One or more designated travelers 102 with their registered phones are tracked by cell towers 108 to determine their proximity to an arrival location 104. If an actual arrival (return) time, or a predicted return time, is later than a designated arrival time for one or more registered phones belonging to the one or more travelers, then one or more messages (text, email, or automated call) are sent to one or more responsible 3$^{rd}$ parties 106 (the emergency contact persons). For determining a predicted arrival time, at least the current position of travelers 102 and applicable route conditions 110 between the travelers and the arrival location are taken onto account. For predictions, an observed rate of travel for the trip up to that point in time may also be taken into account, since it is indicative of how frequently and for how long the travelers stop for gas, food, bathroom breaks, etc.

For operation of a first exemplary embodiment of the invention, a user registers a planned trip including the one or more travelers to be tracked. The user is typically a traveler, but may be separate from the travelers. The user registering the trip designates one or more arrival locations (most frequently a home location) and one or more phones (any cellular enabled portable computing device) belonging to the one or more travelers, wherein the one or more phones are enabled for GPS tracking. Operation of the method then comprises for example:

Per step S202 of FIG. 2, receive a request from a user to set up a trip, including designated travelers and their cell phone numbers, a specified return date and time for the trip (the designated arrival time), contact information for emergency contact persons, and a referenced GPS-locatable arrival location (typically a home location).

Per step S204 of FIG. 2, track the phone locations for one or more designated travelers. Tracking typically starts at a designated start time, or after a specified delay after the specified start time to allow for possible false starts or actual delays in the start time for the trip.

Per step S206 of FIG. 2, if the designated arrival time passes (either originally registered arrival time or extended/adjusted arrival time) before any designated phone belonging to the one or more designated travelers arrives at the arrival location, then determine that an emergency condition may exist and send a message (text, email, or automated call) to one or more responsible 3$^{rd}$ parties (emergency contact persons) to request that they perform at least one or more of:

1) Attempting to contact the one or more designated travelers; and
2) If the one or more travelers cannot be contacted, then taking an emergency action that comprises at least one or more of:
    a) Accessing the home location to care for pets and/or people.
    b) Contacting law enforcement to report that the one or more travelers are missing.

Figure 3:
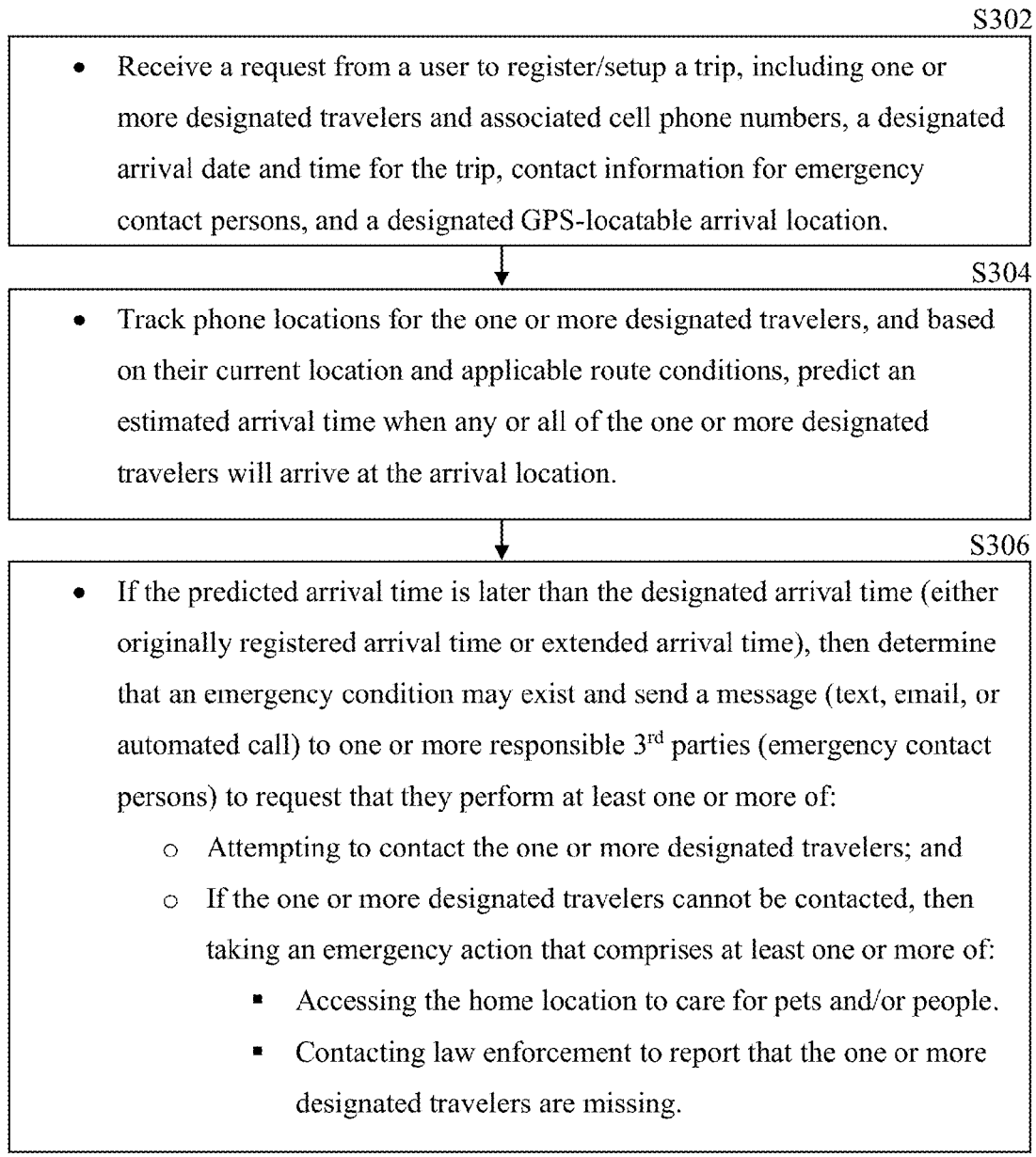
FIG. 3 shows a flow chart for a second exemplary embodiment of the invention wherein $3^{rd}$ parties are notified if it is predicted based at least in part on the traveler's current location and applicable route conditions, that the travelers won't return home (the arrival location) by a specified date/time.

For operation of a second exemplary embodiment of the invention, an exemplary method comprises:

Per step S302 of FIG. 3, receive a request from a user to set up a trip, including designated travelers and their cell phone numbers, a specified return date and time for the trip (the designated arrival time), contact information for emergency contact persons, and a referenced GPS-locatable arrival location (typically a home location).

Per step S304 of FIG. 3, track the phone locations for one or more designated travelers, and given their current location(s) and applicable route conditions between their current location(s) and the arrival location, predict when any of the one or more of the travelers will arrive at the arrival location.

Per step S306 of FIG. 3, if the predicted arrival time is later than the designated arrival time (either the originally registered arrival time or an extended arrival time), then determine that an emergency condition may exist and send a message (text, email, or automated call) to one or more responsible 3$^{rd}$ parties to request that they perform at least one or more of:

1) Attempting to contact the one or more designated travelers.
2) If the one or more designated travelers cannot be contacted, then taking an emergency action that comprises at least one or more of:
    a) Accessing the home location of the one or more designated travelers to care for pets and/or people.

b) Contacting law enforcement to report that the one or more designated travelers are missing.

Adjustment During Trip:

Any of the user who registered the trip, or optionally any of the one or more travelers, can adjust the designated return/arrival time during a trip. It may happen that during a trip, the travelers may decide to extend or shorten their trip for any of a number of reasons. In that case, they may wish to either delay or advance the originally registered designated arrival time to create an adjusted (most typically extended) arrival time. Emergency contact persons may optionally be informed of such an adjustment.

A warning message may optionally be sent to the one or more travelers a specified number of minutes or hours before the designated arrival time under one or more of the following conditions:

1) regardless of the current location of the one or more travelers;
2) if the current location of the one or more travelers is not within a specified distance or travel time of the arrival location; or
3) if a rate of travel of the one or more travelers is not consistent with predicting an arrival by the designated arrival time.

The user or any of the one or more travelers can respond with buttons or voice commands to delay or advance the designated arrival time.

Any $3^{rd}$ party, typically the emergency contact person(s) can be informed during the trip of a current location of the user and travelling companions, if such informing is enabled by the user setup. The $3^{rd}$ party can query the location of the travelers if it has been enabled during setup of the trip that they are permitted to do so. Also, the $3^{rd}$ party may be provided a predicted arrival time, based on at least the current location of the one or more travelers and applicable route conditions.

If the one or more travelers don't respond to warnings within a specified amount of time, then the emergency contact person(s) are contacted. The emergency contact person(s) can be notified of the traveler's last known position in case they need to contact authorities.

By tracking the location of the travelers, provision can be made to allow for periods of time when the one or more travelers travel into areas with little or no cellular coverage. If the travelers are in an area without cellular coverage the system can allow some additional time before contacting $3^{rd}$ parties after any attempt to contact them is made.

Trip-Over Notification:

A $3^{rd}$ party is optionally designated to be notified (phone, email, text, etc.) upon the return/arrival of the travelers. This $3^{rd}$ party may be an emergency contact person or an additional $3^{rd}$ party that is not an emergency contact person. A typical scenario is a pet sitter that needs to be notified so that they know the traveler's pets are ok. If the travelers are delayed, then the pet sitter may also be notified as described above, however pet sitters usually have a policy of always being notified upon their clients return home. When GPS tracking indicates the travelers have returned/arrived, such a notification is sent.

When the travelers arrive and any trip-ending contacts and notifications have been made, the trip notification function will normally be automatically canceled. Note that at the beginning of the trip, a designated time duration must pass before the notification function goes into effect. This prevents premature cancelling of a tracking/notification function if a traveler returns home prematurely and/or temporarily (for instance to take care of something they forgot) before actually beginning the planned trip.

A system for operation of the methods described herein typically includes at least one or more of:

1) A software app on a user's phone (or smartphone access to a website or server) where the phone is enabled for GPS tracking; and
2) A software application running on a website or server or in the Cloud that communicates with the user, tracks the traveler's phones, and communicates with $3^{rd}$ parties when necessary.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory user machine-readable medium, or a non-transitory machine-readable storage medium that can be in a form of a digital circuit, an analog circuit, a magnetic medium, or combination thereof. The application program may be uploaded to, and executed by, a machine comprising any suitable architecture. Preferably, the machine is implemented on a user machine platform having hardware such as one or more central processing units ("CPUs"), a memory, and input/output interfaces. The user machine platform may also include an operating system and microinstruction code. The various processes and functions described herein may be either part of the microinstruction code or part of the application program, or any combination thereof, which may be executed by a CPU, whether or not such user machine or processor is explicitly shown. In addition, various other peripheral units may be connected to the user machine platform such as an additional data storage unit and a printing unit.

What is claimed is:

1. A computerized process for determining a potential emergency condition and alerting designated users thereto via at least one of a plurality of communication networks, whereby the process is performed utilizing a system comprising at least, one or more processors residing on a server or in the Cloud;
a cellular communications network,
an internet;
a source of information regarding applicable route conditions; and
one or more cellular phones each comprising a processor and a GPS receiver, wherein the one or more cellular phones are associated with one or more designated travelers;

wherein to alert one or more emergency contact persons of a potential emergency condition, the process further comprises:

receiving from a first user:
cellular phone numbers for the one or more designated travelers;
a GPS-locatable arrival location;
a designated date and time for an expected arrival (hereinafter: the designated arrival time) at the arrival location;

one or more emergency contact persons to be notified of a potential emergency condition; and contact information for the one or more designated travelers and the one or more emergency contact persons;

automatically retrieving via the cellular communications network and the Internet, GPS position data generated by the one or more GPS receivers within the one or more cellular phones;

automatically tracking, using at least the GPS position data received through the cellular communications network at the Internet, current locations of the one or more designated travelers;

automatically determining a proximity of the one or more designated travelers with respect to the arrival location by comparing the current locations of the one or more designated travelers with the position of the arrival location;

automatically determining at the designated arrival time, that a potential emergency condition exists because the one or more travelers have not reached the arrival location by the designated arrival time; and automatically altering the one or more emergency contact persons to inform them of the potential emergency condition.

2. The computerized process of claim 1, further comprising:

upon automatic determination that a potential emergency condition exists, before automatically contacting the one or more emergency contact persons to alert them, automatically attempting to contact the one or more travelers to determine if the potential emergency condition is, or is not, an actual emergency condition.

3. The computerized process of claim 1, further comprising:

additionally receiving from the first user, a prioritized sequence for contacting the one or more emergency contact persons, when the one or more emergency contact persons comprise a plurality of persons; and upon automatic determination that a potential emergency condition exits, automatically alerting the one or more emergency contact persons in the prioritized sequence.

4. The computerized process of claim 1, further comprising:

adjusting the designated arrival time during the trip to create a new designated arrival time, the adjusting performed by the first user or any of the designated travelers.

5. The computerized process of claim 1, further comprising:

automatically sending a warning message to the one or more of the travelers at a specified point in time in advance of the designated arrival time under one or more of the following conditions:

a) regardless of the one or more traveler's current location;
b) if the one or more traveler's current location is not within a specified distance from the arrival location; or
c) if an observed rate of travel of the one or more travelers and/or an analysis of applicable route conditions isn't consistent with an arrival at the arrival location by the designated arrival time.

6. The computerized process of claim 5, further comprising:

if the one or more travelers don't respond to the warning message within a specified amount of time, then:

a) automatically determining, using at least the GPS position data received through the cellular communications network and the Internet, a last known location of the one or more designated travelers; and b) automatically informing the one or more emergency contact persons of the last known location of the one or more travelers.

7. The computerized process of claim 1, further comprising:

automatically determining, using at least the GPS position data received through the cellular communications network and the Internet, a last known location of the one or more designated travelers;

receiving information from the cellular communications network via the Internet with respect to cellular coverage in the last know location of the one or more travelers, and if the last known location of the one or more travelers was in or near areas known to have little or no cellular coverage, allowing additional time before informing the one or more emergency contact persons that the one or more travelers didn't respond to the warning message.

8. The computerized process of claim 1, further comprising:

automatically retrieving, via the Internet, information regarding applicable route conditions between the current location of the one or more travelers and the arrival location, and automatically sending a warning message to the one or more of the travelers when a rate of travel of the one or more travelers in view of applicable route conditions isn't consistent with an arrival at the arrival location by the designated arrival time.

9. The computerized process of claim 1, further comprising:

automatically retrieving, via the Internet, information regarding applicable route conditions between the current location of the one or more travelers and the arrival location, and automatically predicting a rate of travel of the one or more travelers based on the applicable route conditions and automatically estimating a revised arrival time based on the predicted rate of travel.

10. A computerized process for determining a potential emergency condition and alerting designates users thereto via at least one of a plurality of communications networks, whereby the process is performed utilizing a system, comprising at least:

one or more processors residing on a server or in the Cloud;
a cellular communications network;
an internet;
a source of information regarding applicable route conditions; and
one ore more cellular pones each comprising a processor and a GPS receiver, wherein the one or more cellular phones are associated with one or more designated travelers;

wherein to alert one or more emergency contact persons of a potential emergency condition, the process further comprises:

receiving from a first user:
cellular phone numbers for the one or more designated travelers;
a GPS-locatable arrival location;
a designated date and time for an expected arrival (hereinafter: the designated arrival time) at the arrival location;
one or more emergency contact persons to be notified of a potential emergency condition;

contact information for the one or more designated travelers and the one or more emergency contact persons; and automatically retrieving via the cellular communications network and the Internet, GPS position data generated by the one or more GPS receivers within the one or more cellular phones;

automatically tracking using at least the GPS position data, locations of the one or more designated travelers to determine a proximity of the one or more designated travelers with respect to the arrival location;

automatically retrieving from the source of information regarding applicable route conditions, information regarding route conditions between a current location of the one or more designated travelers and the arrival location, automatically predicting an arrival time for the one or more designated travelers to reach the arrival location, based at least in part on the current location for the one or more designated travelers and the applicable route conditions;

if the predicted arrival time is later than the designated arrival time, automatically determining that a potential emergency condition exists; and automatically alerting the one or more emergency contact persons to inform them of the potential emergency condition.

11. The computerized process of claim 10, further comprising:

upon automatic determination that a potential emergency condition exists, before contacting the one or more emergency contact persons, attempting to contact the one or more travelers to determine if the potential emergency condition is, or is not, an actual emergency condition.

12. The computerized process of claim 10, further comprising:

additionally receiving from the first user, a prioritized sequence for contacting the one or more emergency contact persons, when the one or more emergency contact persons comprise a plurality of persons; and upon automatic determination that a potential emergency condition exists, automatically alerting the one or more emergency contact persons in the prioritized sequence.

13. The computerized process of claim 10, further comprising:

adjusting the designated arrival time during the trip to create a new designated arrival time, the adjusting performed by the first user or any of the designated travelers.

14. The computerized process of claim 10, further comprising:

automatically sending a warning message to one or more of the travelers at a specified point in time in advance of the designated arrival time under one or more of the following conditions:

a) regardless of the one or more traveler's current location;
b) if the one or more traveler's current location is not within a specified distance from the arrival location; or
c) if an observed rate of travel of the one or more travelers and/or an analysis of applicable route conditions isn't consistent with an arrival at the arrival location by the designated arrival time.

15. The computerized process of claim 14, further comprising:

if the one or more travelers don't respond to the warning message within a specified amount of time, then:

a) automatically determining, using at least the GPS position data received through the cellular communication network and the Internet, at last know location of the one or more designated travelers; and
b) automatically informing the one or more emergency contact persons of the last known location of the one or more travelers.

16. The computerized process of claim 14, further comprising:

automatically determining, using at least the GPS position data received through the cellular communication network and the Internet, a last know location of the one or more designated travelers;

receiving information from the cellular communications network via the Internet with respect to cellular coverage in the last know location of the one or more travelers; and if the last known location of the one or more travelers was in or near areas known to have little or no cellular coverage, allowing additional time before informing the one or more emergency contact persons that the one or more travelers didn't respond to the warning message.

17. A computerized process for determining a potential emergency condition and alerting designated users thereto via at least one of a plurality of communications networks, whereby the process is performed utilizing a system comprising at least:

one or more processors residing on a server or in the Cloud;
a cellular communications network;
an internet;
a source of information regarding applicable route conditions; and
one or more cellular phones each comprising a processor, a GPS receiver, and a software app, the one or more cellular phones being associated with one or more designated travelers;

wherein to alert one or more emergency contact persons of a potential emergency condition, the process further comprises:

receiving from a first user:

cellular phone numbers for the one or more designated travelers;
a GPS-locatable arrival location;
a designated date and time for an expected arrival (hereinafter: the designated arrival time) at the arrival location;
one or more emergency contact persons to be notified of a potential emergency condition;
contact information for the one or more designated travelers and the one or more emergency contact persons; and automatically retrieving via the cellular communications network and the Internet, GPS position data generated by the one or more GPS receivers within the one or more cellular phones;

automatically tracking using at least the GPS position data, locations of the one or more designated travelers to determine:

a) a proximity of the one or more designated travelers with respect to the arrival location;
b) an observed rate of travel that includes any of stops for: gas; food; and bathroom breaks;

automatically retrieving from the source of information regarding applicable route conditions, information regarding route conditions between a current location of the one or more designated travelers and the arrival location;

automatically predicting an arrival time for the one or more designated travelers to reach the arrival location, based at least in part on:
i) the current location for the one or more designated travelers;
ii) the observed rate of travel;
iii) the applicable route conditions;
if the predicted arrival time is later than the designated arrival time, automatically determining that a potential emergency condition exists; and
automatically alerting the one or more travelers and/or the one or more emergency contact persons to inform them of the potential emergency condition.

* * * * *